Oct. 13, 1970 H. R. BEURRIER 3,534,284

AUTOMATIC PHASE-LOCKING CIRCUIT

Filed Nov. 15, 1967 2 Sheets-Sheet 1

INVENTOR
H. R. BEURRIER

BY Sylvan Sherman

ATTORNEY

Oct. 13, 1970 H. R. BEURRIER 3,534,284
AUTOMATIC PHASE-LOCKING CIRCUIT
Filed Nov. 15, 1967 2 Sheets-Sheet 2

United States Patent Office 3,534,284
Patented Oct. 13, 1970

3,534,284

AUTOMATIC PHASE-LOCKING CIRCUIT

Henry R. Beurrier, Chester Township, Morris County, N.J., assignor to Bell Telephone Laboratories, Incorporated, Murray Hill, N.J., a corporation of New York Filed Nov. 15, 1967, Ser. No. 683,264
Int. Cl. H03b *3/04*
U.S. Cl. 331—10 3 Claims

ABSTRACT OF THE DISCLOSURE

The dynamic frequency range and the drive requirements of a phase-locked oscillator are significantly improved by means of a combined feed-forward and feed-back control circuit. The feed-forward portion of the circuit compares the phase of the oscillator output with that of the input synchronizing signal. To insure that this comparison is made at the proper instant for both signals, a time delay is included in the feed-forward circuit to delay the synchronizing signal.

The error signal produced by the above-described comparison is fed back to retune the phase-locked oscillator, In effect, the oscillator has a dynamic "free-running" frequency.

Predictable transients in the phase characteristic of a pulse phase-locked oscillator can also be corrected by means of a suitably shaped compensating pulse applied to the oscillator along with the error signal.

This invention relates to automatic phase control circuits for use with phase-locked oscillators.

BACKGROUND OF THE INVENTION

As is known, an oscillator can be made to lock onto and track an external driving signal whose frequency is near the free-running frequency of the oscillator and whose amplitude is significantly less than the oscillator output amplitude. (See, "A Study of Locking Phenomena in Oscillators," by R. Adler, Proceedings of the Institute of Radio Engineers, June 1946, and "Tunnel Diode Oscillators," by F. Sterzer and D. E. Nelson, Proceedings of the Institute of Radio Engineers, April 1961, pages 744–753.) Recently there has been considerable interest displayed in the use of a phase-locked oscillator in such varied applications as a tunable bandpass filter, an FM or AM amplifier, and an AM-FM converter. In the copending application by W. M. Hubbard and W. D. Warters, Ser. No. 475,758, filed July 20, 1965, a phase-locked oscillator is used as a regenerative repeater.

It is a characteristic of phase-locked oscillators that the amplitude of the synchronizing signal required to effect locking increases as the frequency of the synchronizing signal deviates from the oscillator's free-running frequency. As a result, a phase-locked oscillator tracks a synchronizing signal of constant amplitude over a limited frequency range. Even in those situations in which large amplitude sychronizing signals are available, there is clearly a finite limit to the frequency deviation that can be realized.

In addition to the dynamic range limitations and drive signal requirements referred to above, many applications require a high degree of phase coherency between the synchronizing signal and the phase-locked oscillator. Clearly, any tendency for the transfer phase to change introduces error into the system. As an example, the need to maintain a high degree of coherency in a high power multiplexed phased-arrays radar antenna system requires phase-locked oscillators having a high degree of phase stability.

SUMMARY OF THE INVENTION

In accordance with the present invention, the dynamic frequency range and the drive requirements of a phase-locked oscillator are significantly improved by means of a combined feed-forward and feed-back control circuit. The feed-forward portion of the circuit compares the phase of the oscillator output signal with that of the input synchronizing signal. To insure that this comparison is made at the proper instant for both signals, a time delay is included in the feed-forward circuit to delay the synchronization signal.

The error signal produced by the above-described comparison is fed back to retune the phase locked oscillator. In effect, the oscillator has a dynamic "free-running" frequency.

It is an advantage of the invention that by retuning the phase-locked oscillator, the dynamic frequency range is no longer limited by the pulling ability of the synchronizing signal but is extended over the tuning range of the error signal. Furthermore, since the synchronizing signal is essentially maintained at the oscillator's "free-running" frequency, the amplitude of the synchronizing signal is essentially a constant.

The final, and perhaps most significant, advantage of the invention is the resulting high level of phase coherency that is maintained between the oscillator output signal and the synchronizing signal.

In accordance with another feature of the present invention, predictable transients in the phase characteristic of a pulsed phase-locked oscillator can also be corrected by means of a suitably shaped compensating pulse applied to the oscillator along with the error signal.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
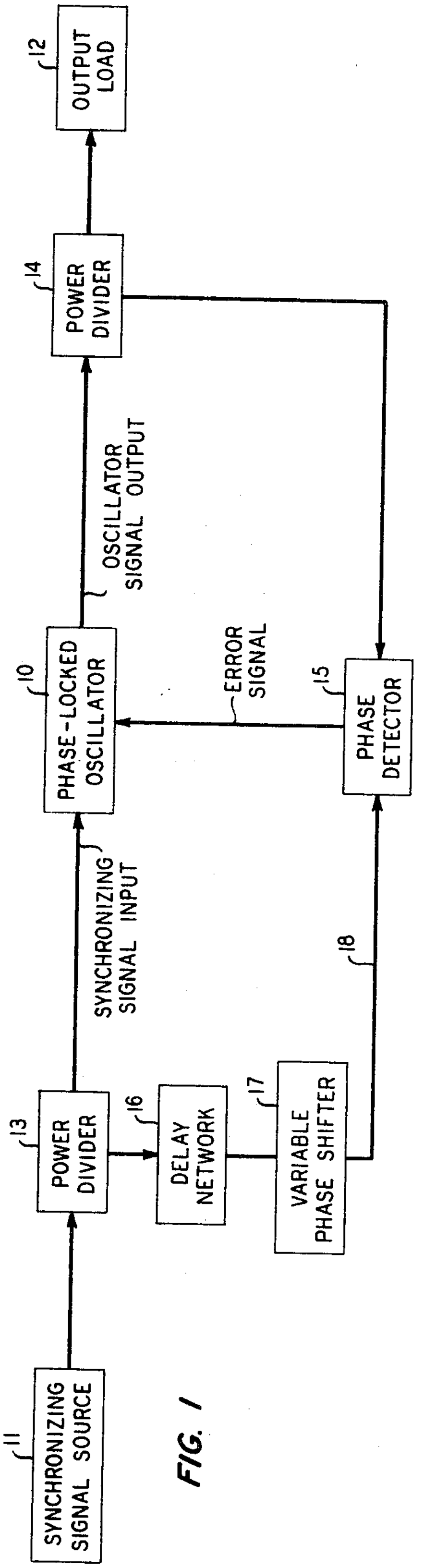
FIG. 1 shows, in block diagram, a phase-locked oscillator and associated control circuits in accordance with the present invention.

Referring to the drawings, FIG. 1 shows, in block diagrams, a phase-locked oscillator and associated circuitry for insuring a high level of phase coherency between the input and output signals. Typically, a phase-locked oscillator comprises an oscillator 10 to which there is coupled a synchronizing signal, derived from a synchronizing signal source 11. The oscillator output signal is coupled to an output load 12. In accordance with the invention, improved phase coherency is obtained by comparing the relative phase of the input synchronizing signal and the oscillator output signal, and then using the resulting difference, or error signal, to control the oscillator frequency. Accordingly, the synchronizing signal and the output signal are sampled by means of power dividers 13 and 14, and the sampled signals coupled to a phase detector 15. The error signal produced by phase detector 15 is then coupled back to oscillator 10 so as to change the oscillator frequency. The method of returning employed depends upon the type of oscillator used. For example, a negative resistance diode oscillator can be conveniently tuned by changing the direct-current bias applied to the diode. Alternatively, the bias applied to a varactor diode connected in the resonant circuit of the oscillator can be changed by the error signal to effect retuning. In all cases, however, retuning is such as to reduce the phase difference between the input and the output signals.

In order that the input and output signals be compared in the proper time domain, it is necessary to recognize and take account of the fact that there is a finite time delay associated with oscillator 10. That is, changes in the synchronizing signal and corresponding changes in the output signal do not occur at the same instant in time. Thus, these two signals cannot be directly compared. Accordingly, a time delay network 16 and an adjustable phase shifter 17 are included in the feed-forward path 18 connecting power divider 13 to phase detector 15. The time delay and phase shift afforded by these components matches the time delay and phase shift associated with oscillator 10.

When oscillator 10 is in synchronism with the synchronizing signal, the error signal generated by phase detector 15 is zero and, consequently, there is no correction applied to the oscillator, and none is required. If, however, there is a momentary instability which tends to affect the oscillator frequency, the resulting change in phase of the output signal relative to the synchronizing signal is detected in the phase detector and the necessary correction made in the oscillator to compensate for this instability. Similarly, if the synchronizing signal is frequency-modulated, there is a phase change detected as the phase of the synchronizing signal changes in accordance with the modulation. The resulting error signal retunes the oscillator in a manner to keep the oscillator locked to the synchronizing signal as the latter deviates in frequency. As can be seen, in either situation the tendency and the ability of the output signal to remain in phase synchronism with the synchronizing signal is greatly enhanced.

Figure 2:
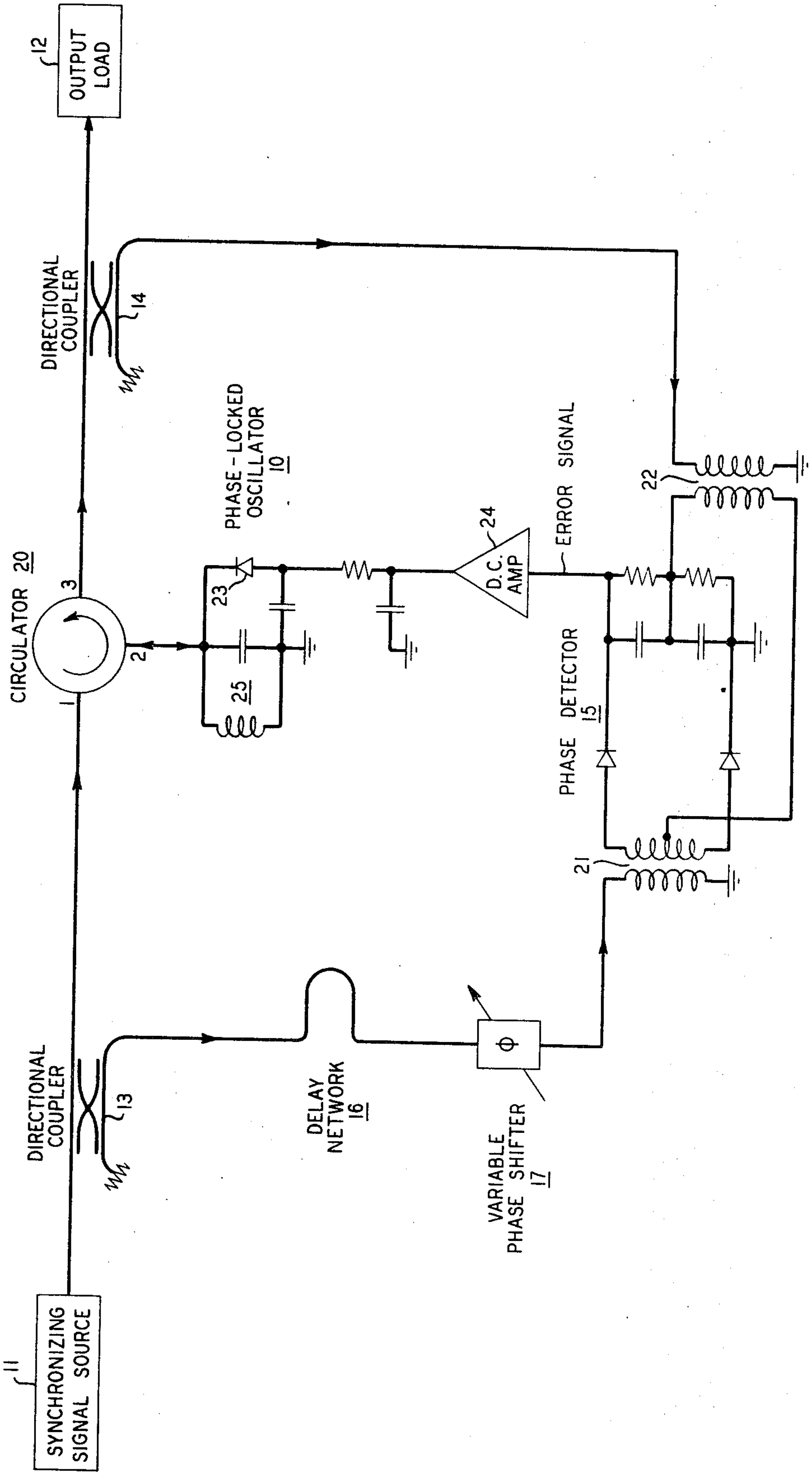
FIG. 2 shows the oscillator of FIG. 1 in greater detail.

FIG. 2 shows, in somewhat greater detail, a phase-locked oscillator and associated circuitry in accordance with the invention. Using the same identification numerals for corresponding parts, power dividers 13 and 14 are depicted as directional couplers. A portion of the synchronizing signal derived from synchronizing signal source 11 is coupled to phase detector 15 through delay network 16, shown simply as a length of transmission line, and variable phase shifter 17. The remaining portion of the synchronizing signal is coupled to phase-locked oscillator 10. To prevent any of the oscillator output signal from being coupled back toward source 11, a three port circulator 20 is also included in the embodiment of FIG. 2. The circulator couples the synchronizing signal between circulator port 1, connected to coupler 13, and circulator port 2, connected to oscillator 10. The oscillator output signal is coupled from circulator port 2 to circulator port 3, connected to coupler 14. The latter extracts a small portion of the output signal and couples it to detector 15. The rest of the oscillator output signal is coupled to output load 12.

By adjusting phase shifter 17 such that the two signals coupled to input transformers 21 and 22 of phase detector 15 are 90 degrees out of phase, the error signal generator by detector 15 is zero. (For a more detailed discussion of the operation of phase detector 15, see "Frequency Modulation," by N. Marchand, Rinehart Books, Inc., 1948, page 72.)

The error signal derived from detector 15 is coupled back to oscillator 10 in a manner to retune the oscillator. As illustrated in FIG. 2, the oscillator includes a resonant, L-C circuit 25 and a voltage-sensitive negative resistance diode 23. Accordingly, retuning is achieved by using the error signal to vary the bias applied to diode 23. A D.C. amplifier 24 can also be included in the error signal path to amplify the error signal and to set the reference bias on diode 23.

Figure 3:
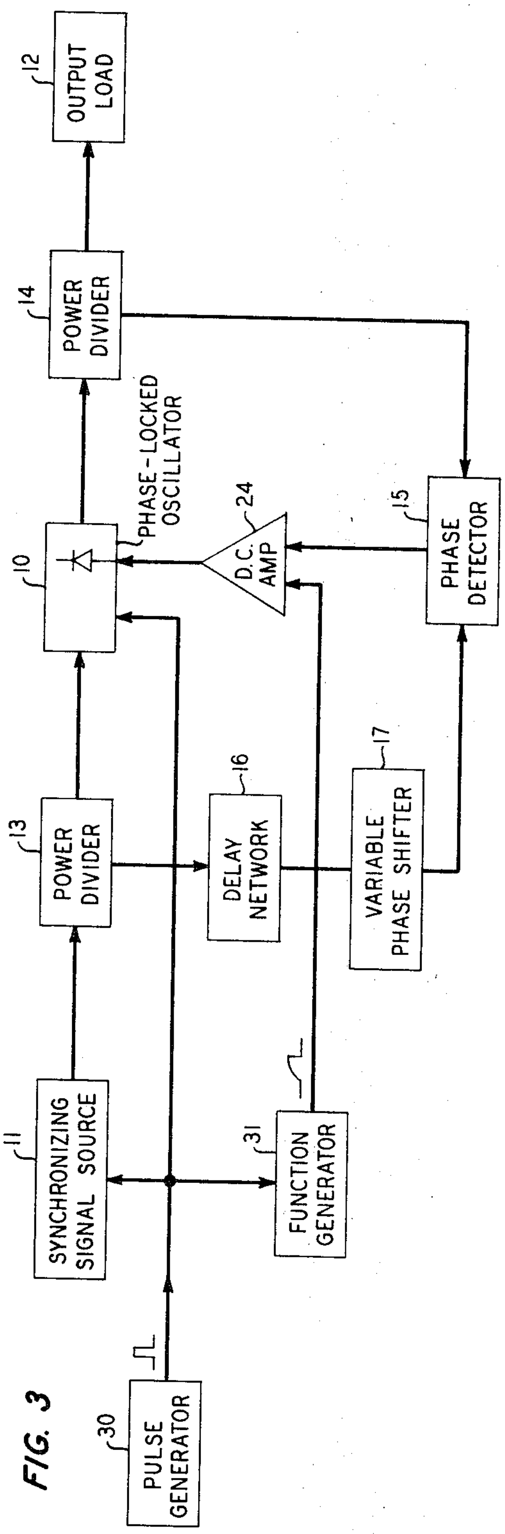
FIG. 3 shows, in block diagram, the oscillator of FIG. 2 including means for correcting transient changes in the phase characteristic of a pulsed phase-locked oscillator.

In some applications, such as radar, the phase-locked oscillator is pulsed rather than operated continuously. To avoid predictable cycle-by-cycle phase changes produced by power supply transients and heating effects, in the phase-locked oscillator when it is pulsed on, a compensating correction signal can be applied to the oscillator along with the error signal described above. FIG. 3 shows, in block diagram, an automatic phase-locked oscillator in accordance with the invention including, in addition to the features described in connection with FIGS. 1 and 2, a pulse generator 30 and a function generator 31. Pulse generator 30 pulses both the synchronizing signal source 11 and the phase-locked oscillator 10 on and off. In addition, pulses from generator 30 are coupled to function generator 31 wherein a compensating signal is generated to minimize the effects of transient circuit changes upon the phase characteristic of oscillator 10. This can be done in an open-ended manner since the phase characteristic of oscillator 10, as a function of the above-noted transients, can be accurately determined and, hence, readily compensated.

The output from the function generator can be utilized in any number of different ways, depending upon the type of phase-locked oscillator employed. In FIG. 3, the function generator is shown coupled to D.C. amplifier 24 where it acts to modify the bias applied to the oscillator diode.

It will be readily recognized that other oscillator circuits and arrangements for retuning the oscillator can be devised. For example, the error signal can be used to drive a motor for mechanically tuning the oscillator or the error signal can be used to change the bias applied to a varactor diode comprising an element of the oscillator resonant circuit. Similarly, any other of the many phase detector circuits can be used instead of the particular detector shown. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. In combination:

an oscillator;

a synchronizing signal source;

and means for phase-locking said oscillator to said signal source comprising:

a phase detector;

means for coupling a portion of the output signal from said oscillator to said detector;

means, including a delay network, for coupling a portion of the synchronizing signal to said phase detector;

means for coupling the output from said phase detector to said oscillator for phase-locking said oscillator;

means, including a pulse generator, for pulsing said oscillator and said synchronization source on and off;

means, responsive to said pulse generator, for generating a compensating signal for reducing phase changes in said oscillator due to predictable transient circuit changes;

and means for coupling said compensating signal to said oscillator.

2. The combination according to claim 1 wherein: said oscillator is voltage-sensitive;

and wherein said error signal controls the voltage applied to said oscillator.

3. The combination according to claim 1 wherein: said oscillator includes a negative resistance diode;

and wherein said error signal controls the direct current bias applied to said diode.

References Cited

UNITED STATES PATENTS

| | | | |
|---|---|---|---|
| 3,281,710 | 10/1966 | Hoover et al. | 331—10 |
| 3,359,505 | 12/1967 | Smeulers | 331—10 |

OTHER REFERENCES

Mackey: IRE Trans. on Microwave Theory and Tech., pp. 228–235, July 1962.

JOHN KOMINSKI, Primary Examiner

U.S. Cl. X.R.

331—9, 17